(12) United States Patent
Bose

(10) Patent No.: US 9,999,179 B2
(45) Date of Patent: Jun. 19, 2018

(54) ENCLOSURE TEMPERATURE CONTROL SYSTEM

(71) Applicant: Sustainable Energy & AgricultureTechnology LLC, Sahuarita, AZ (US)

(72) Inventor: Ashoke Bose, Sahuarita, AZ (US)

(73) Assignee: THE BOSE FAMILY TRUST, Sahuarita, AZ (US)

( * ) Notice: Subject to any disclaimer, the term of this patent is extended or adjusted under 35 U.S.C. 154(b) by 42 days.

(21) Appl. No.: 15/211,398

(22) Filed: Jul. 15, 2016

(65) Prior Publication Data
US 2017/0013789 A1    Jan. 19, 2017

Related U.S. Application Data

(60) Provisional application No. 62/194,022, filed on Jul. 17, 2015.

(51) Int. Cl.
*A01G 9/24* (2006.01)
*F24F 5/00* (2006.01)

(52) U.S. Cl.
CPC ............ *A01G 9/243* (2013.01); *A01G 9/246* (2013.01); *F24F 5/0021* (2013.01); *F24F 5/0046* (2013.01); *F24F 5/0071* (2013.01); *F24F 2005/0067* (2013.01); *Y02A 30/272* (2018.01); *Y02B 10/20* (2013.01); *Y02B 10/24* (2013.01); *Y02E 60/147* (2013.01); *Y02E 70/30* (2013.01)

(58) Field of Classification Search
CPC ....... A01G 9/243; A01G 9/246; F24F 5/0071; F24F 5/0021; F24F 5/0046; F24F 2005/0067; Y02E 60/147; Y02E 70/30; Y02B 10/24; Y02B 10/20; Y02A 30/272
See application file for complete search history.

(56) References Cited

U.S. PATENT DOCUMENTS

| 4,213,448 A * | 7/1980 | Hebert ................. F24J 2/0444 126/400 |
| 4,270,359 A | 5/1981 | Hummel |

(Continued)

FOREIGN PATENT DOCUMENTS

| GB | 2259231 A | 10/1993 |
| WO | 2009018016 A2 | 2/2009 |
| WO | 2015077235 A1 | 5/2015 |

*Primary Examiner* — Michael C Zarroli
(74) *Attorney, Agent, or Firm* — Invention To Patent Services; Alex Hobson

(57) ABSTRACT

An enclosure temperature control system utilizes a renewable power source and a thermal sink to reduce the overall power requirements from a power grid. A renewable power source, such as a solar panel may provide power that drives the components required to maintain the greenhouse temperature within upper and lower limits, including a HVAC system and/or a heat transfer system coupled with a thermal sink. The thermal sink includes a phase change material that releases heat when it solidifies and this heat can be used to heat the greenhouse. Likewise, the phase change material absorbs heat during the day to reduce the temperature within the greenhouse. A heat transfer system may be coupled with the phase change material and a solid conductor component within the tank of a phase change material may increase thermal transfer rate.

17 Claims, 6 Drawing Sheets

(56) References Cited

U.S. PATENT DOCUMENTS

| | | | |
|---|---|---|---|
| 4,416,260 A * | 11/1983 | Proctor | A01G 9/243 |
| | | | 126/400 |
| 4,452,228 A | 6/1984 | Meyer | |
| 4,462,390 A * | 7/1984 | Holdridge | A01G 9/243 |
| | | | 126/400 |
| 4,498,459 A | 2/1985 | Eliyaho Karin et al. | |
| 5,505,788 A | 4/1996 | Dinwoodie | |
| 7,441,558 B2 * | 10/2008 | Leifer | F24D 11/0257 |
| | | | 122/13.01 |
| 7,767,903 B2 | 8/2010 | Marshall | |
| 8,154,728 B2 * | 4/2012 | Hu | G01N 21/39 |
| | | | 356/437 |
| 8,359,750 B2 * | 1/2013 | Tran | F28D 20/023 |
| | | | 29/890.03 |
| 8,484,986 B2 | 7/2013 | Waibel | |
| 8,745,919 B2 * | 6/2014 | Chang | A01G 9/243 |
| | | | 47/17 |
| 9,212,826 B2 * | 12/2015 | Everett | F24F 5/0021 |
| 2007/0044494 A1 * | 3/2007 | Ally | C09K 5/063 |
| | | | 62/260 |
| 2010/0101621 A1 | 4/2010 | Xu | |
| 2010/0198414 A1 | 8/2010 | Kroll | |
| 2011/0067852 A1 * | 3/2011 | Farrar | B65D 88/745 |
| | | | 165/263 |
| 2015/0223407 A1 * | 8/2015 | Carroll | A01G 9/243 |
| | | | 47/17 |
| 2015/0274415 A1 * | 10/2015 | Farrar | B65D 88/745 |
| | | | 165/248 |
| 2017/0005615 A1 * | 1/2017 | Fairbanks | H02S 40/425 |

* cited by examiner

ENCLOSURE TEMPERATURE CONTROL SYSTEM

CROSS REFERENCE TO RELATED APPLICATIONS

This application claims the benefit of priority to U.S. provisional patent application No. 62/194,022, filed on Jul. 17, 2015 and entitled Near Zero Carbon Emission Greenhouse Technology; the entirety of which is hereby incorporated by reference herein.

BACKGROUND OF THE INVENTION

Field of the Invention

The present invention relates to hybrid heating systems that employ renewable energy technologies, such as photovoltaic panels or cells, for regulating the temperature within an enclosure and particularly greenhouse.

Background

Many factors are contributing to the increase in greenhouses and Controlled Environment Agriculture (CEA) enclosures, including, increasing population, loss of farmlands to housing and other uses, global climate change and increasing demand for organic products. Greenhouses are an enclosure that allows sunlight to pass through the enclosure wells to grow plants, whereas CEA enclosures utilizes powered light sources, grow-lights, to grow plants. Greenhouses and CEA enclosures are used for growing food including vegetables and herbs as well as for growing medicinal products, such as marijuana. The world greenhouse vegetable production surpassed one million acres in 2012, as reported by International Greenhouse Vegetable Production Statistics, Cuesta Roble Consulting, 2013. This increased demand for greenhouses, especially the demand for greenhouses in areas where temperatures frequently fall outside of normal growing temperatures, requires supplemental heating and cooling systems to regulate and control the greenhouse temperature. Drawing the required power to regulate greenhouse temperature from utility companies increases the cost of production and puts an additional drain on the already taxed power grid.

There exists a need for an enclosure temperature control system that provides a near zero emission burden on the environment, whereby the greenhouse draws little net power to no power from the power grid to maintain a suitable greenhouse temperature.

SUMMARY OF THE INVENTION

The invention is directed to a temperature control system for enclosures, and particularly greenhouses that employ renewable power sources as well as phase change materials. Greenhouses required temperature control within a certain range to ensure that the plants therein grow and are not stressed due to temperature extremes or fluctuations. Other enclosures that may benefit from a temperature control system as described herein include enclosures that have a high heat source therein, such as data centers, computer server enclosures, as well as dwellings, homes, office areas, recreational vehicles, RV's, and the like. An exemplary temperature control system of the present invention may enable temperature control with reduced or no net electrical power required from a grid power source.

Greenhouses are buildings having high light transmission through the enclosure to allow plants to grow quickly and efficiently, even in environments where the outside temperatures would not be conducive for growing such plants. A greenhouse may have an upper and lower desired temperature range that is ideal for growing a particular type of plant, such as tomatoes, having a desired temperature range from about 21° C. to 29.5° C. An exemplary enclosure, or in this example, a greenhouse temperature control system may control the temperature within this desired temperature range utilizing a, heat from a phase change material and an auxiliary temperature control system, such as a heating, ventilating, and air-conditioning (HVAC) unit when required. Power for a heat transfer system coupled to a phase change material and power for the auxiliary temperature control system may be drawn from a renewable power supply, such as solar panels when possible and from a power grid when required. In addition, any excess power generated by an exemplary renewable power supply may be delivered back to the power grid, thereby reducing the over power consumption requirements of the temperature control system. During the day, the solar panels may generate enough renewable power to power a heater or cooler of an HVAC system and may provide any excess power generated back to the power grid. During the night however, the solar panels will not be producing power and this is when heat from the phase change material may be used to heat the interior of the greenhouse. In an exemplary embodiment, the renewable power source, or solar panels may generate enough power such that the excess power supplied back to the power grid is equal to or greater than the power drawn from the grid. In this way, the net power requirement from the power grid is zero. A power meter, may be used to measure the power input to the temperature control system or to the enclosure and to measure power fed back to the power grid. A meter may be a bi-directional meter.

Greenhouses have transparent panels, such as windows comprising glass or polymer sheets that allow the sunlight to penetrate therethrough to heat and grow plants within the interior of the greenhouse. The enclosure area of an exemplary greenhouse may have high surface area percentage of light transparency, or area that allows light to pass through, such as but not limited to, about 40% or more, about 50% or more, about 60% or more, about 75% or more, about 85% or more and any range between and including the percentages provided. An exemplary greenhouse may have the south facing walls and roof area made from translucent materials and may reflective materials within the greenhouse, such as along the floor and/or walls to further distribute the sunlight. An exemplary greenhouse may have a generally rectangular footprint having vertical wall that define a rectangular area. The roof of a greenhouse may be peaked, or gable style, or may be curved wherein the roof is dome or cylindrically shaped. An exemplary greenhouse may have any suitable size including, but not limited to about 20 m³ or more, about 50 m³ or more, about 100 m³ or more, about 1000 or more and any range between and including the volumes provided. It is to be understood that the components of the enclosure temperature control system would have to be scaled to provide effectively greenhouse temperature control.

An exemplary enclosure temperature control system comprises a power network that is a connected system for electrical power deliver and distribution to the devices of the temperature control system. In an exemplary embodiment, a power grid is connected to the power network and provides power for the HVAC system, lights within the greenhouse, the control system, as well as the heat transfer system and other devices, such as fans, vents and the like. An exemplary enclosure temperature control system comprises a renewable power source, or a power source that derives power from any naturally occurring, theoretically inexhaustible source of energy including solar, wind, tidal, wave, and hydroelectric power. A renewable power source does not require the burning of a fossil or nuclear fuel to produce power, for example. An exemplary renewable power source of the present invention is solar, or a solar power source comprising one or more solar panels or photovoltaic panels or cells. The solar power source or solar panels may be configured on or above the roof of the greenhouse or may be configured within the interior of the greenhouse. Solar panels can lose power production efficiency when the temperature becoming exceeding high, such as above about 40° C. Therefore, solar panels configured with the interior of the greenhouse, wherein the temperature is controlled, may perform better when the outside temperatures become increasing high. The renewable power source generates power that can be used to power the HVAC system, lights within the greenhouse, the control system, as well as the heat transfer system and other devices, such as fans, vents and the like. When the renewable power source generates excess power, this excess power may be delivered back to the power grid to reduce the overall or net power requirement from the grid. The control system may be coupled with the power network including the power grid and the renewable power source and may control one or more switches to enable the renewable power to be delivered to components of the greenhouse, or to the power grid. The renewable power may first go through an inverter before it is delivered to the power grid and a meter may be used to measure the amount of grid power being delivered to the greenhouse from the power grid as well as the amount of renewable power being delivered back to the power grid. In another exemplary embodiment, excess power generated by the renewable power source may be used to charge a battery for later use. Large rechargeable metal air batteries, available from Fluidics Inc., Scottsdale Ariz., may be used for this purpose, for example.

An exemplary temperature control system comprises an auxiliary temperature control system to regulate and control the greenhouse temperature and may include a heater and/or a cooler. In some environments wherein the outside temperature remains cool, such as below the lower threshold temperature of the interior of the greenhouse, a heater may only be required. Likewise, in very hot environments only a cooler, such as an air conditioner or swamp cooler may be required. In most environments however, an auxiliary temperature control system comprises both a heater or heating device and a cooler and may be referred to as a HVAC system. A heater or heating device may comprise electrical resistive heaters, a gas or fuel burning heater and the like. An exemplary auxiliary temperature control system may also comprise a vent or ventilation system, wherein the greenhouse temperature can be changed by air exchange with the outside environment. For example, when the greenhouse temperature becomes too high, or approaches the upper threshold limit, the auxiliary temperature control system may exchange the interior air of the greenhouse with cooler external air to reduce the greenhouse temperature.

An exemplary enclosure temperature control system comprises a heat sink that stores heat, such as during the day, for later release, such as during the night. An exemplary heat sink comprises a phase change material (PCM) that releases heat, latent heat of fusion, when the material freezes. The latent heat of fusion or enthalpy of fusion of a substance, is the change in its enthalpy resulting from providing energy, typically heat, to a specific quantity of the substance to change its state from a solid to a liquid at constant pressure. For example, a phase change material may melt during the day when the greenhouse temperature is easily maintained above the lower threshold temperature and then freeze at night, as the greenhouse temperature drops to release heat and provide this heat to the interior of the greenhouse. An exemplary phase change material is a substance with a high heat of fusion that is capable of storing and releasing large amounts of energy. The heat of fusion of a phase change material is the heat that is stored and absorbed or released when the material changes from solid to liquid. Phase change materials are classified as latent heat storage (LHS) units. Phase change materials may have an increase in temperature when in a solid phase until the temperature reaches the melting temperature, at which point the phase change material melts from a solid to a liquid and absorbs large amounts of heat at an almost constant temperature. The PCM then continues to absorb heat without a significant rise in temperature until all the material is transformed to the liquid phase. When the temperature of the phase change material in the liquid phase drops back to the melting point, the phase change material solidifies, releasing the stored latent heat. The volumetric heat capacity of a phase change material is defined as:

Volumetric heat capacity (VHC) $J \cdot m^{-3} \cdot K^{-1}$

Phase change materials are available with melting temperature ranging from −5 up to 190° C. and many within the lower and upper threshold limits of most greenhouses, can store five to fourteen times more heat per unit volume than conventional storage materials such as water, masonry or rock. For this reason, phase change materials are preferred as a heat sink in the present invention. In an exemplary embodiment, a phase change material may have a melting temperature that is within the desired greenhouse temperature range or between the upper and lower threshold limits. This enables the phase change material to melt during the daylight hours to store heat and then release this heat as the greenhouse temperature drops at night.

Any suitable type of phase change material may be used including, but not limited to salt hydrates, fatty acids and esters, and various paraffins (such as octadecane) and ionic liquids. Most organic solutions type phase change materials are water-free, and can therefore be exposed to air. However, salt based phase change materials must be sealed in an enclosure to prevent water evaporation or uptake. Suitable phase change materials are available from Climator Sweden AB, Entropy Solution LLC and PureTemp Inc., of Plymouth Minn., Pluss Advanced Technologies Ltd of India and RGEES LLC, Candler, N.C. An exemplary phase change material is PCM-HS22P from RGEES LLC, an inorganic hydrated salt mixture having a melting temperature of 23° C., liquid density of 1540 kg/m³, solid density of 1840 kg/m³, latent heat of 185 kJ/kg, and specific heat-liquid 0.73 kcal/kg·K).

Table 1 provides a list of some exemplary paraffin phase change materials.

TABLE 1

| Material | Melting point ° C. | Heat of fusion kJ · kg⁻¹ |
| --- | --- | --- |
| Paraffin 14-Carbons [35] | 5.5 | 228 |
| Paraffin 15-Carbons [35] | 10 | 205 |
| Paraffin 16-Carbons [35] | 16.7 | 237.1 |

TABLE 1-continued

| Material | Melting point ° C. | Heat of fusion kJ · kg⁻¹ |
|---|---|---|
| Paraffin 17-Carbons [35] | 21.7 | 213 |
| Paraffin 18-Carbons [35] | 28 | 244 |
| Paraffin 19-Carbons [35] | 32 | 222 |
| Paraffin 20-Carbons [35] | 36.7 | 246 |
| Paraffin 21-Carbons [35] | 40.2 | 200 |
| Paraffin 22-Carbons [35] | 44 | 249 |
| Paraffin 23-Carbons [35] | 47.5 | 232 |
| Paraffin 24-Carbons [35] | 50.6 | 255 |
| Paraffin 25-Carbons [35] | 49.4 | 238 |
| Paraffin 26-Carbons [35] | 56.3 | 256 |
| Paraffin 27-Carbons [35] | 58.8 | 236 |
| Paraffin 28-Carbons [35] | 61.6 | 253 |
| Paraffin 29-Carbons [35] | 63.4 | 240 |
| Paraffin 30-Carbons [35] | 65.4 | 251 |
| Paraffin 31-Carbons [35] | 68 | 242 |
| Paraffin 32-Carbons [35] | 69.5 | 170 |
| Paraffin 33-Carbons [35] | 73.9 | 268 |
| Paraffin 34-Carbons [35] | 75.9 | 269 |

Table 2 provides a list of some other exemplary types of phase change materials.

TABLE 2

| Material | Melting point ° C. | Heat of fusion kJ · kg⁻¹ |
|---|---|---|
| Formic acid [35] | 7.8 | 247 |
| Caprilic acid [35] | 16.3 | 149 |
| Glycerin [35] | 17.9 | 198.7 |
| p-Lattic acid [35] | 26 | 184 |
| Methyl palmitate [35] | 29 | 205 |
| Camphenilone [35] | 39 | 205 |
| Docasyl bromide [35] | 40 | 201 |
| Caprylone [35] | 40 | 259 |
| Phenol [35] | 41 | 120 |
| Heptadecanone [35] | 41 | 201 |
| 1-Cyclohexylooctadecane [35] | 41 | 218 |
| 4-Heptadacanone [35] | 41 | 197 |
| p-Joluidine [35] | 43.3 | 167 |
| Cyanamide [35] | 44 | 209 |
| Methyl eicosanate [35] | 45 | 230 |
| 3-Heptadecanone [35] | 48 | 218 |
| 2-Heptadecanone [35] | 48 | 218 |
| Hydrocinnamic acid [35] | 48 | 118 |
| Cetyl acid [35] | 49.3 | 141 |
| α-Nepthylamine [35] | 59 | 93 |
| Camphene [35] | 50 | 238 |
| O-Nitroaniline [35] | 50 | 93 |
| 9-Heptadecanone [35] | 51 | 213 |
| Thymol [35] | 51.5 | 115 |
| Methyl behenate [35] | 52 | 234 |
| Diphenyl amine [35] | 52.9 | 107 |
| p-Dichlorobenzene [35] | 53.1 | 121 |
| Oxolate [35] | 54.3 | 178 |
| Hypophosphoric acid [35] | 55 | 213 |
| O-Xylene dichloride [35] | 55 | 121 |
| β-Chloroacetic acid [35] | 56 | 147 |
| Chloroacetic acid [35] | 56 | 130 |
| Nitro napthalene [35] | 56.7 | 103 |
| Trimyristin [35] | 33 | 201 |
| Acetic acid [35] | 16.7 | 184 |
| Polyethylene glycol 600 [35] | 20 | 146 |
| Capric acid [35] | 36 | 152 |
| Eladic acid [35] | 47 | 218 |
| Pentadecanoic acid [35] | 52.5 | 178 |
| Tristearin [35] | 56 | 191 |
| Myristic acid [35] | 58 | 199 |
| Palmatic acid [35] | 55 | 163 |

An exemplary heat sink may comprise one or more tanks for storing the phase change material. The phase change material may perform better in relatively small containers; therefore, a plurality of discrete tanks may be preferred. An individual tank may have a volume of about 2 liters or more, about 4 liters or more, about 10 liters or more, about 20 liters or more, no more than about 30 liters, no more than about 20 liters, no more than about 10 liters and any range between and including the volumes provided. Theses tanks may be configured within the interior of the greenhouse or outside of the greenhouse. For example, a plurality of tanks may be configured and dispersed within the greenhouse, contain a phase change material with a melting temperature between the lower and upper threshold temperature limits of the greenhouse, to more effectively absorb heat and release heat throughout the greenhouse. When a tank is configured outside of the greenhouse, a heat transfer system comprising a conduit may extend from the interior of the greenhouse to the tank thereby providing heat transfer from the phase change material to the interior of the greenhouse by way of the heat transfer fluid. A heat transfer fluid may flow through a radiator configured within the greenhouse to more effectively and quickly transfer heat from the heat transfer fluid to the interior of the greenhouse.

An exemplary phase change material is a composite phase change material comprising a solid conductor component that is configured within the phase change material to conduct heat to and from the phase change material. An exemplary solid conductor component is a porous or permeable metal, such as a metal screen, mesh, or fabric. The solid conductor component may be coupled with the tank and configured to conduct heat from the phase change material to the tank. The tank may be couple with a heat transfer device or a heat transfer system to more effectively conduct heat to and from the phase change material. For example, a tank may comprise a plurality of fins that extend from the exterior of the tank and these fins may be subject to airflow from an airflow device, or to natural convection to more effectively exchange heat with the tank and with the phase change material therein. A heat transfer system may comprise a conduit that is configured in contact with the tank, such as being wrapped around the tank, wherein a heat transfer fluid passes through the conduit to carry heat to and/or from the tank and phase change material. In an exemplary embodiment, a solid conductor component is a conduit that is coupled with heat transfer conduit, whereby the heat transfer fluid flows through the tank. A solid conductor conduit may spiral or run in a serpentine configuration within a tank to provide more surface area of contact between said conduit and the phase change material. A tank may comprise a transparent window to allow sunlight to pass into the tank to heat the phase change material within the tank thereby reducing and/or eliminating the need for a heat transfer system to melt the phase change material.

An exemplary control system controls the greenhouse temperature within the upper and lower threshold limits and may draw from a plurality of power sources and heating/cooling devices to accomplish this task. An exemplary control system comprises a controller having a processor, such as a microprocessor and a user interface. A user may input important set points, such as the greenhouse temperature upper and lower threshold limits. A user may use any conventional means to input this information into the control system. The control system may comprise memory for storing important information including set points and temperature readings. A control system is coupled with a temperature sensor for measuring the greenhouse temperature and may be coupled with an outside temperature sensor for measuring the ambient temperature outside of the greenhouse. An exemplary control system is coupled with a power grid and a renewable power source, such as solar panels and may open one or more electrical switches to control the flow of electrical power to the auxiliary temperature control system, such as a HVAC system. As described herein, the control system may utilize power from the renewable power source when possible and then switch over to the grid power from the power grid when required. In addition, the control system may send at least a portion of the renewable power back into the power grid through an inverter when possible. One or more electrical switches may be controlled by the control system to control the flow of power from the power sources to other components of temperature control system including, but not limited to, sensors, lights, auxiliary temperature control system including the heater and/or cooler, heat transfer system and the like. A control system may initiate one or more of these devices or system as a function of the greenhouse temperature moving outside of a desired temperature range and/or the upper and lower greenhouse temperature limits. A desired temperature range may be a temperature range that falls within the lower and upper temperature limits and may initiate heating and cooling to prevent the greenhouse temperature from moving outside of the lower and upper limits. For example, the upper and lower temperature limits may 32° C. and 12.7° C. respectively and the desired temperature range or desired upper limit and desired lower limit may be 29.5° C. and 18° C. respectively.

In an exemplary method of controlling the greenhouse temperature, an exemplary enclosure temperature control system as described herein comprises a plurality of phase change material tanks configured within the interior of the greenhouse and a solar panel renewable power source. During the day renewable power from the renewable power source is used to heat and/or cool the greenhouse by the auxiliary temperature control system. When no auxiliary heating or cooling is required, renewable power is fed back to a power grid. At night, as the greenhouse temperature drops below the lower desired limit, a flow of heat transfer fluid is initiated through the conduits of the heat transfer system. The heat transfer fluid collects heat from the phase change material as it solidifies and this heat is transferred into the interior of the greenhouse to heat the greenhouse and keep it above the lower threshold limit. When and if the greenhouse temperature reaches the lower threshold limit, the auxiliary heater may be initiated and may be powered by the grid power or from battery power.

An exemplary enclosure temperature control system may regulate the temperature within an enclosure, such as a greenhouse within a temperature range from 20° C. to 28° C., for example. A phase change material having a melting temperature of 22° C. may be configured within the greenhouse to provide heating during nighttime hours. During the daytime, sunlight warms the greenhouse and if the PCM is not already in a liquid state, the PCM will melt as the temperature rises above 22° C. The melting temperature of the PCM may be between the upper and lower threshold temperatures. If the temperature in the greenhouse approaches the upper threshold temperature of 28° C., a cooler, such as an air-conditioner unit may be turned on by the control system to keep the temperature within the desired range. Solar panels coupled with the control system may provide the required power for the AC unit. As the sun goes down, the temperature in the greenhouse may drop and in dry environments, such as the desert areas, the temperature may drop quickly and substantially. Temperature swings of 20° C. or more are common. As the temperature approaches the lower temperature threshold of 20° C., the PCM material may begin to freeze and release the latent heat of fusion to warm the enclosure. A heat transfer system may be powered on to more effectively distribute the heat from the PCM material as it freezes. If the heat released from the PCM material is not enough to maintain the temperature above the lower threshold temperature, then the control system may turn on a heater of an auxiliary temperature control system to warm the greenhouse. Power for the auxiliary temperature control system, or heater at night time, may be drawn from the power grid, as the solar panels will not be creating any power. Alternatively, power requirements at night maybe drawn from a rechargeable battery that is charged by the renewable power source, such as solar panels and/or a wind power source, such as a wind turbine.

The summary of the invention is provided as a general introduction to some of the embodiments of the invention, and is not intended to be limiting. Additional example embodiments including variations and alternative configurations of the invention are provided herein.

BRIEF DESCRIPTION OF THE DRAWINGS

The accompanying drawings are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
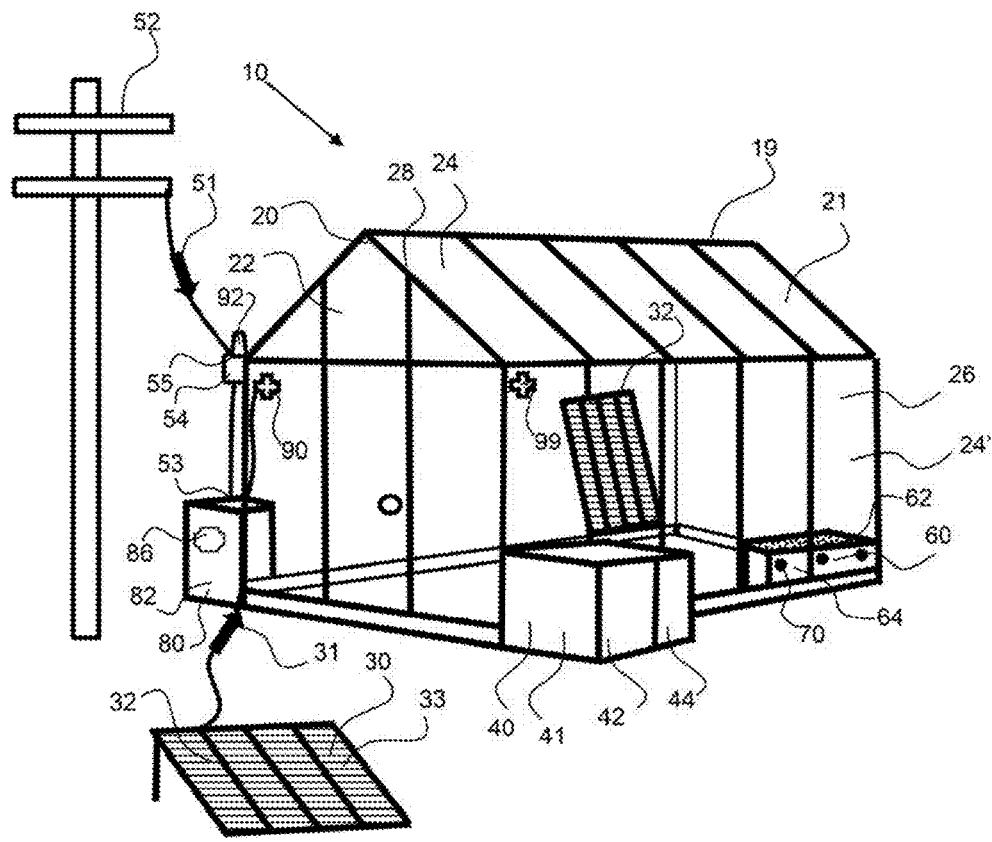
FIG. 1 shows a perspective view of an exemplary enclosure temperature control system comprising a phase change material tank, an auxiliary temperature control system and solar panels.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

In cases where the present specification and a document incorporated by reference include conflicting and/or inconsistent disclosure, the present specification shall control.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications and improvements are within the scope of the present invention.

As shown in FIG. 1, an exemplary enclosure temperature control system 10 is configured to control the interior 21 temperature of a greenhouse 20 enclosure 19. The greenhouse is defined by an enclosure 22 comprising transparent panels 24, 24' on the walls 26 and roof 28, respectively. The combined surface area of the walls and the roof define the enclosure area, or surface area of the enclosure. The enclosure area includes a high percentage of transparent panels, greater than 80%. A renewable power source 30 comprises a solar power source 32, or solar panel comprising photovoltaic cells 33 or panels. A solar panel is configured outside of and inside of the greenhouse or interior of the enclosure. In some cases, the solar panels are only configured outside of the enclosure, as they may take up a lot of space, space required for growing plants. However, in some embodiments, solar panels may be configured within the greenhouse, such as along the north wall, wherein sun enters predominately from the south and is incident on the solar panels, for example. The renewable power 31 may be used to power the auxiliary temperature control system 40, such as a HVAC system 41 and comprising a heater 42 and cooler 44, such as an AC unit. The auxiliary temperature control system may be used to provide heating or cooling to the greenhouse in the event that the lower or upper limit greenhouse temperature thresholds are reached or are approaching. A power grid 52 is coupled with the control system 80 to provide grid power 51 through an electric interface 53. The control system may use power from the renewable power source or the power grid to power the components of the enclosure temperature control system, and/or other requirements such as lights or pumps, for example. When there is excess renewable power generated, it may be fed back to the power grid after passing through and inverter 54 and switch 92. A meter 55 may measure the power into and power fed back to the grid and may be a bi-directional meter. A temperature sensor 90 measures the interior greenhouse temperature, and temperature sensor 99 measures the ambient or outside temperature and this data is provided to the control system, which comprises a controller 82 to turn on various components of the temperature control system to maintain the interior temperature of the enclosure 19. The control system may comprise one or more microprocessors 86 for running programs, and making determination on when to activate components of the system. A tank 64 comprises a thermal sink 60 comprising a phase change material 62. The tank is configured within the interior of the greenhouse and PCM stores thermal energy for release when the greenhouse temperature drops. A heat transfer system 70 is coupled with the tank to increase the rate or efficiency of heat transfer from the phase change material to the interior of the greenhouse.

Figure 2:
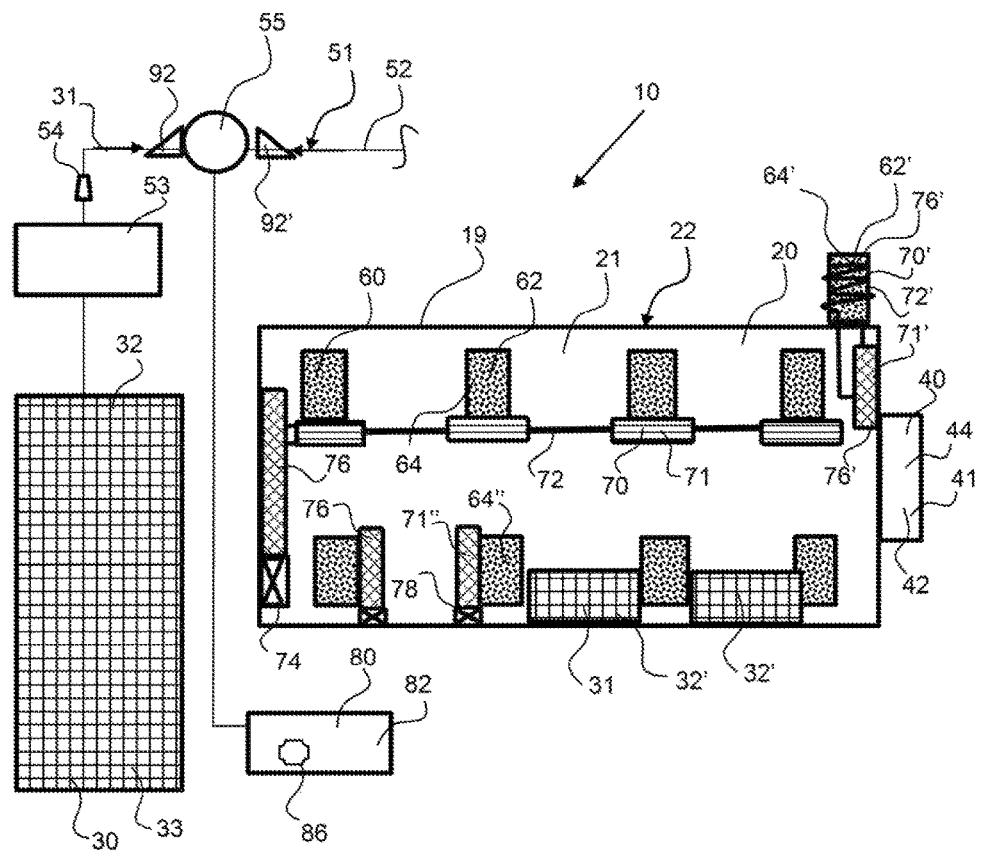
FIG. 2 shows a top down diagram of an exemplary enclosure temperature control system having a plurality of tanks configured around the interior of the greenhouse.

As shown in FIG. 2, an exemplary enclosure temperature control system 10 has a plurality of tanks 64 configured around the interior of the enclosure 19, and one tank 64' is configure outside of the greenhouse. As described herein, phase change material may be more effective when kept in smaller tanks. The plurality of interior tanks are coupled together by a heat transfer system 70 comprising a conduit 72 for the flow of a heat transfer fluid. As shown, some of the tanks are coupled by the heat transfer conduit and the conduit extends to a radiator 76 to allow for more effective heat exchange. A pump 74 may control the flow of heat transfer fluid through the conduit and an airflow device 78 may distribute heat from the radiator. The external tank 64' is also coupled with a heat transfer system 70' having a conduit 72' that is coupled with the tank and extends into the interior of the greenhouse 20, where the heat transfer fluid flows through a heat exchanger 71' such as a radiator 76. Some of the tanks 64" are coupled with a heat transfer device 71" and an airflow device 78, such as a fan, that moves air over the heat transfer device, fins or radiator, for example, to promote heat exchange. A renewable power source 30 is configure outside of the greenhouse and comprises a solar power source 32 comprising photovoltaic cells 33. In addition, a plurality of solar panels 32' are configured inside of the greenhouse. A control system 80 controls when the auxiliary temperature control system 40 is activated, including when a heater 42 or cooler is activated. The control system comprises a microprocessor 86. The control system 80 also controls the flow of power from the power grid 52 and/or from the renewable power source(s) 30. The power grid is coupled to the greenhouse and a meter 55 measures the amount of power to and from the power grid. Renewable power may be fed back to the power grid through an interface 53 after passing through an inverter 54. Switches 92, 92' may be controlled by the control system, or controller to control what power sources is being utilized.

Figure 3:
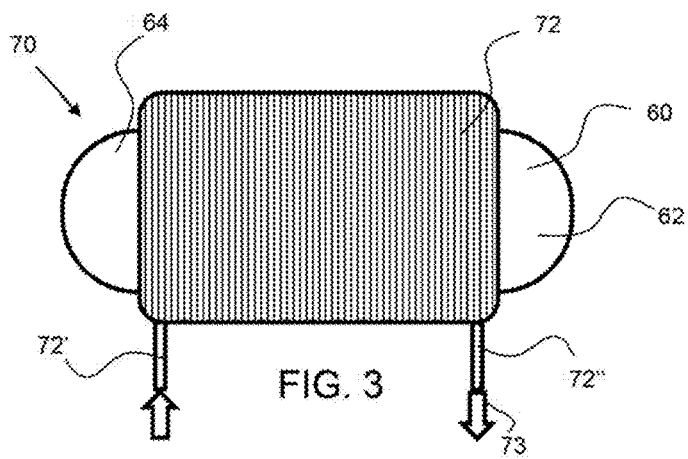
FIG. 3 shows an exemplary phase change material tank having a heat transfer conduit wrapped around the exterior of the tank.

As shown in FIG. 3, an exemplary heat transfer system 70 comprises a thermal sink 60 having a phase change material 62 within a tank 64. A heat transfer conduit 72 is wrapped around the exterior of the tank and a flow of heat transfer fluid 73 therein exchanges heat to and from the phase change material.

Figure 4:
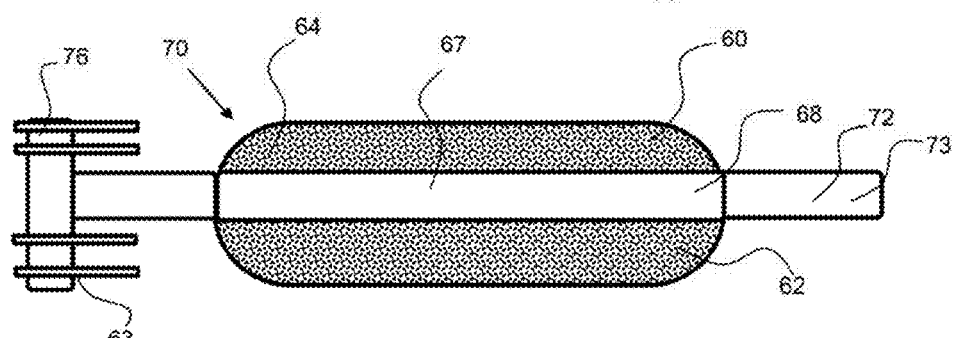
FIG. 4 shows a cross sectional view of an exemplary phase change material tank having a heat transfer conduit coupled with a conduit that extends into the tank.

As shown in FIG. 4, an exemplary heat transfer system 70 comprises a thermal sink 60 having a phase change material 62 within a tank 64. A solid conduct component 67 is a conduit 68 that is coupled with a heat transfer conduit 72. A flow of heat transfer fluid 73 passes through the heat transfer conduit into the solid conductor conduit 68 within the tank and exchanges heat to and from the phase change material and then passes to a radiator 76. The radiator comprises fins 63 to increase heat transfer rates.

Figure 5:
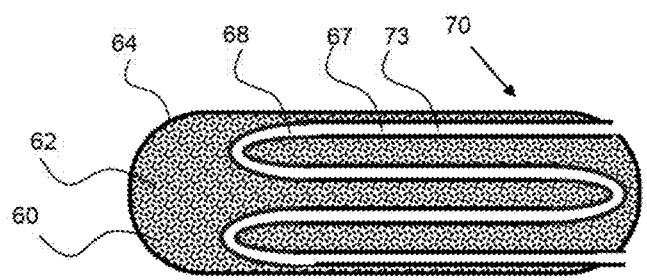
FIG. 5 shows a cross sectional view of an exemplary phase change material tank having a conduit that extends within the tank.

As shown in FIG. 5, an exemplary thermal sink 60 comprises a phase change material tank 64 having a solid conductor conduit 68 that extends within the tank and is configured in a serpentine to increase surface area contact with the phase change material 62. The solid conductor conduit enables a heat transfer fluid 73 to pass through the conduit to exchange heat with the PCM material 62.

Figure 6:
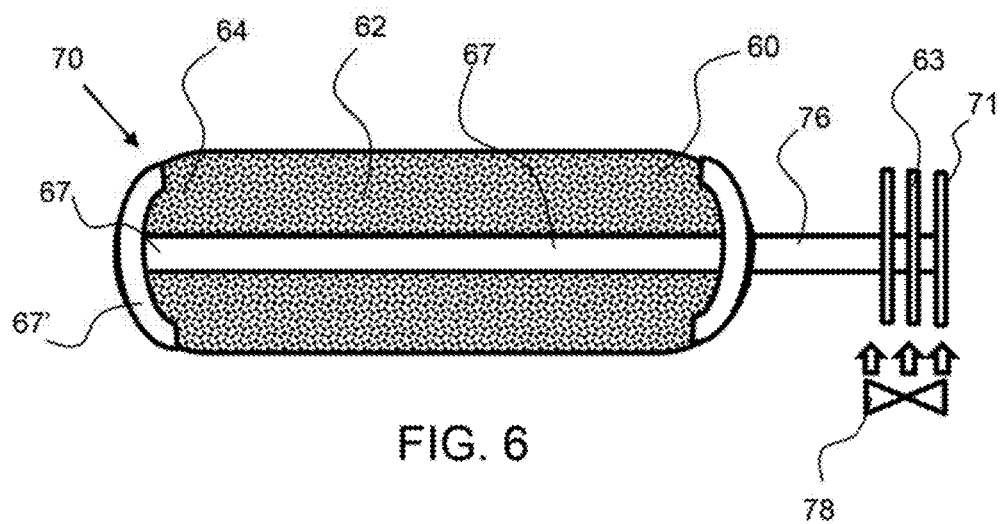
FIG. 6 shows a cross sectional view of an exemplary phase change material tank having a solid conductor component that extends from within the tank to a heat exchanger having fins to increase the rate of heat exchange.

As shown in FIG. 6, an exemplary thermal sink 60 comprises a phase change material tank 64 having a solid conductor 67, 67' that extends within the tank and has contact with the tank. A radiator 76 type heat exchanger device 71 extends from the exterior of the tank and comprises a plurality of fins 63 to increase heat transfer rates through convention. An airflow device 78 is configure to produce convective flow over the radiator.

Figure 7:
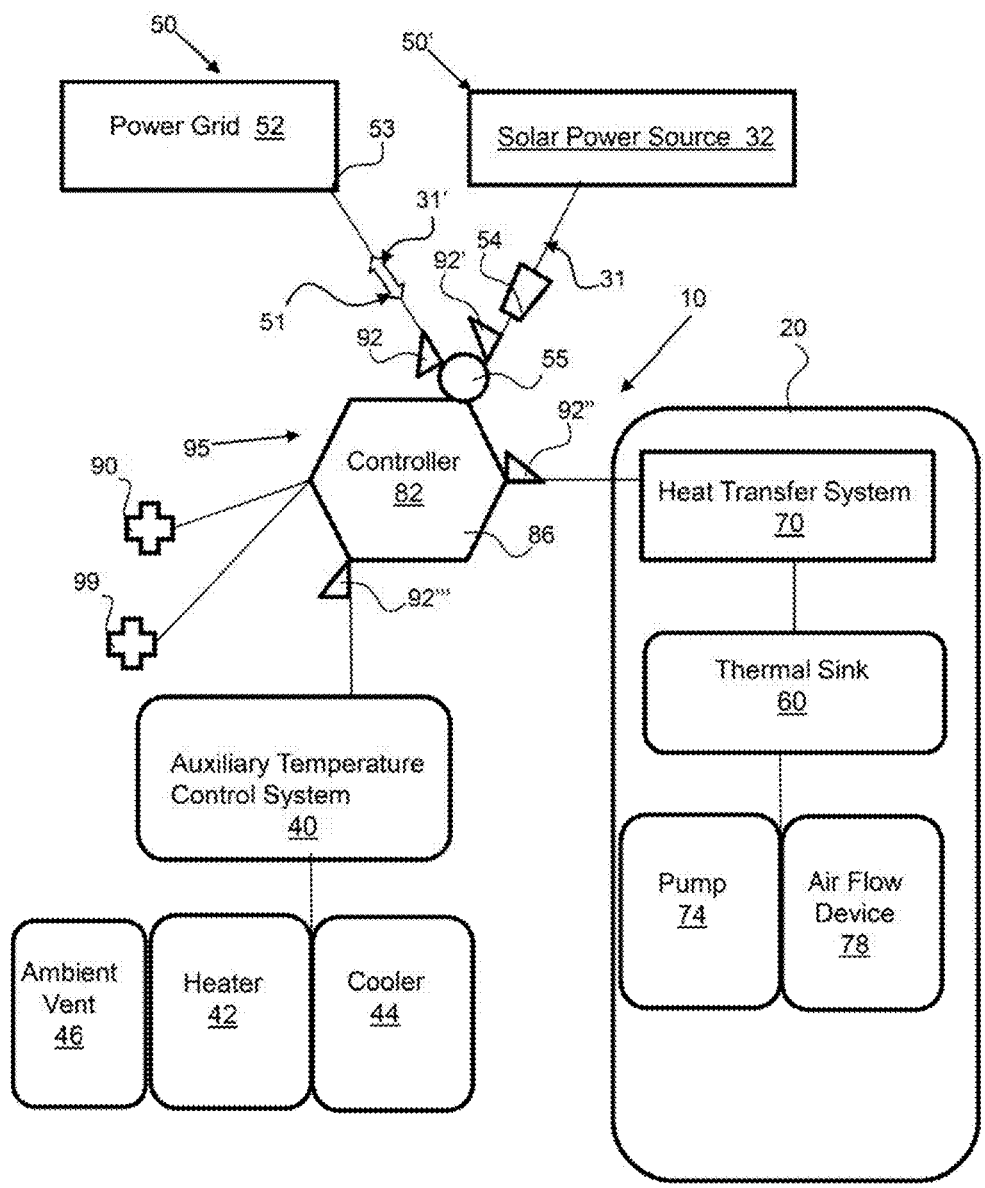
FIG. 7 shows a diagram of an exemplary control system of an enclosure temperature control system.

As shown in FIG. 7, an exemplary control system 80 for an enclosure temperature control system 10 comprises a controller 82 that utilizes a processor 86, such as one of more microprocessor to control the functions of the system. A temperature sensor 90 measures the greenhouse temperature and outside temperature sensor 99 measures the temperature of the ambient environment outside of the greenhouse. The controller initiates the heat transfer system 70 to draw or put heat into the thermal sink 60 and may power the pump 74 and/or airflow device 78. The controller initiates and controls the auxiliary temperature control system to initiate the heater 44, cooler 42 or ambient vent 46 as required to maintain the greenhouse temperature within the lower and upper temperature limits. An ambient vent may simple allow air exchange with the outside ambient air and may comprise an airflow device or simply a damper that is open to allow natural exchange of air. The controller may utilize power from a power network 95 comprising inputs from power sources and outputs to components requiring power. The controller is coupled with power sources 50', 50, a renewable power source 32 and a power grid 52 power source, respectively. The controller may open and/or dose switches 92, 92" to utilized the renewable power 31 or grid power 51 to power the components and systems described herein. Renewable power may be fed back to the power grid through interface 53 after passing through an inverter 54. The controller may open the other switches 92', 92''' to initiate power flow to the other components.

Figure 8:
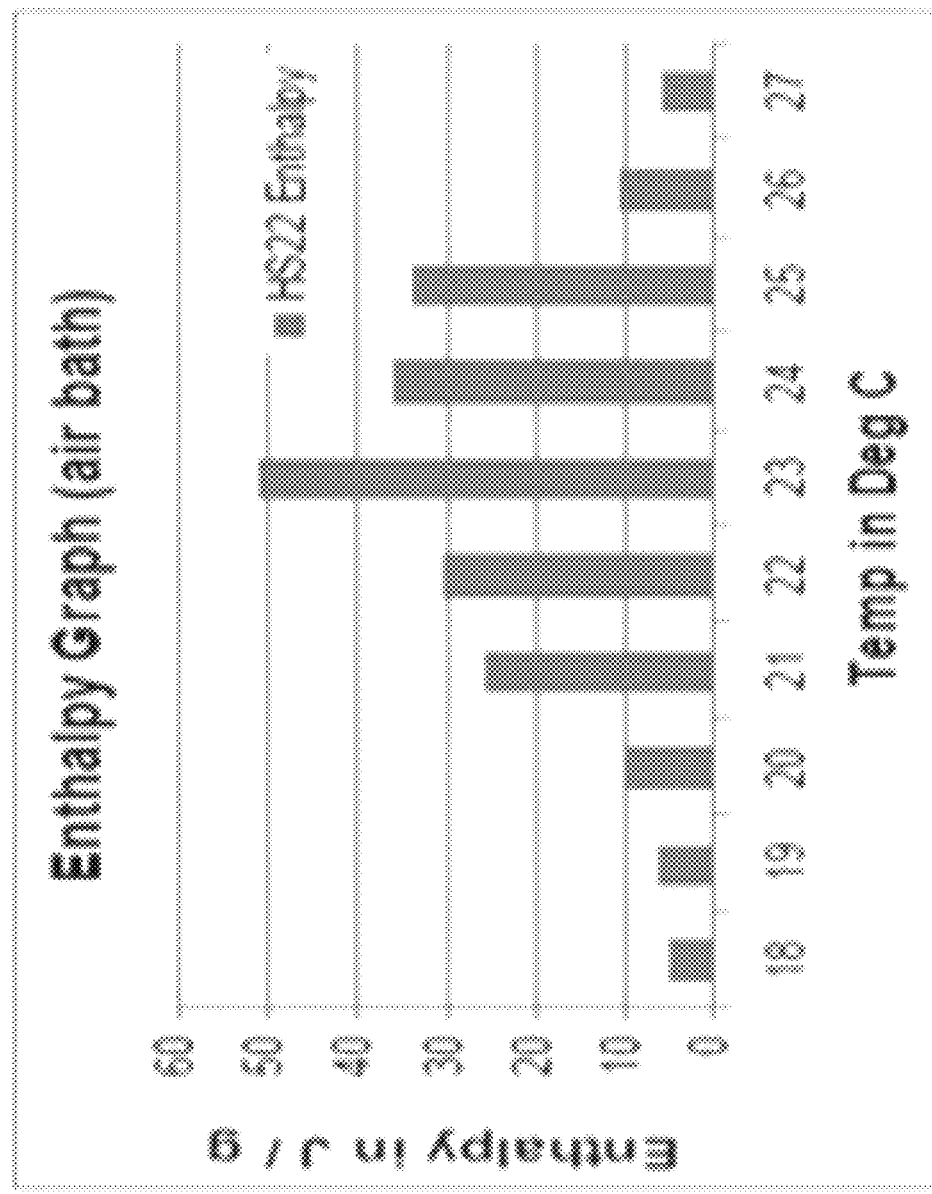
FIG. 8 shows a graph of enthalpy versus temperature for an exemplary phase change material, HS22.

As shown in FIG. 8, the enthalpy of phase change material HS22 from RGEES LLC, increase greatly as the temperature reaches the melting point of 23° C.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. An enclosure temperature control system comprising:
   a) an enclosure that defines an interior of said enclosure;
   b) a solar power source that creates renewable power from sunlight;
   c) an auxiliary temperature control system comprising:
      i) a heater configured to heat the interior of said enclosure;
      ii) a cooler configured to cool the interior of said enclosure;
   d) a thermal sink comprising a phase change material;
   e) a control system comprising:
      i) a power network, for delivering electrical power from the solar power source to the auxiliary temperature control system;
      ii) a computing device having a processor;
      iii) a temperature sensor that measures an enclosure temperature of the interior of said enclosure;

wherein the control system is coupled with the auxiliary temperature control system and turns on the heater when the enclosure temperature drops below a lower threshold temperature and turns on the cooler when the enclosure temperature rises above an upper threshold temperature; and
   wherein the phase change material has a melting temperature between the lower threshold and upper threshold temperatures, and wherein the phase change material will freeze, and release a heat of fusion, to heat the interior of said enclosure when an outside temperature drops below the phase change material melting temperature;
   wherein the phase change material has a depth in a tank when in a liquid state of no more than about 50 mm; and
   wherein the tank has a transparent side to allow sunlight to be incident on the phase change material.

2. The enclosure temperature control system of claim 1, wherein the enclosure is a greenhouse enclosure comprising transparent panels.

3. The enclosure temperature control system of claim 2, wherein the transparent panels make up at least 60% of a greenhouse enclosure area.

4. The enclosure temperature control system of claim 2, wherein the photovoltaic panels are configured within the interior of the greenhouse enclosure.

5. The enclosure temperature control system of claim 1, wherein the solar power source comprises photovoltaic panels.

6. The enclosure temperature control system of claim 1, wherein the renewable power is used to power the auxiliary temperature control system.

7. The enclosure temperature control system of claim 6, wherein the power network is connected to a power grid and wherein the renewable power is delivered to the power grid when not being consumed by the auxiliary temperature control system.

8. The enclosure temperature control system of claim 1, wherein the phase change material has a melting temperature between the lower threshold and upper threshold temperatures.

9. The enclosure temperature control system of claim 8, wherein the phase change material is configured within the interior of the enclosure.

10. The enclosure temperature control system of claim 1, wherein the phase change material and said thermal sink are configured outside of the enclosure.

11. The enclosure temperature control system of claim 1, further comprising a heat transfer system that is thermally coupled with the phase change material.

12. The enclosure temperature control system of claim 11, wherein the heat transfer system comprises a conduit for the flow of a heat transfer fluid, wherein the heat transfer fluid draws heat from the phase change material and transfers said heat to the interior of the enclosure.

13. The enclosure temperature control system of claim 1, wherein the phase change material is a composite phase change material comprising a solid internal conductor component.

14. The enclosure temperature control system of claim 13, wherein the solid internal conductor component is coupled with a heat transfer system.

15. The enclosure temperature control system of claim 14, wherein the heat transfer system comprises a conduit for the flow of a heat transfer fluid, wherein the heat transfer fluid is thermally coupled with the solid internal conductor component and draws heat from the phase change when said phase change material freezes and transfers said heat to the interior of the enclosure.

16. The enclosure temperature control system of claim 15, wherein the solid internal component is a conduit that is coupled with said heat transfer system conduit wherein the heat transfers fluid flows through the solid internal component conduit and through the phase change material.

17. An enclosure temperature control system of comprising:
   a) an enclosure that defines an interior of said enclosure;
   b) a solar power source that creates renewable power from sunlight;
   c) an auxiliary temperature control system comprising:
      i) a heater configured to heat the interior of said enclosure;
      ii) a cooler configured to cool the interior of said enclosure;
   d) a thermal sink comprising a phase change material;
   e) a control system comprising:
      i) a power network, for delivering electrical power from the solar power source to the auxiliary temperature control system;
      ii) a computing device having a processor;
      iii) a temperature sensor that measures an enclosure temperature of the interior of said enclosure; and
   wherein the control system is coupled with the auxiliary temperature control system and turns on the heater when the enclosure temperature drops below a lower threshold temperature and turns on the cooler when the enclosure temperature rises above an upper threshold temperature;
   f) a heat transfer system that is thermally coupled with the phase change material;
      wherein the heat transfer system comprises a conduit for the flow of a heat transfer fluid, wherein the heat transfer fluid draws heat from the chase change material and transfers said heat to the interior of the enclosure; and
   wherein the phase chance material has a melting temperature between the lower threshold and upper threshold temperatures, and wherein the chase change material will freeze, and release a heat of fusion, to heat the interior of said enclosure when an outside temperature drops below the chase change material melting temperature;
   wherein the phase change material is configured within the interior of the enclosure and wherein the solid internal conductor component is coupled with an external radiator, wherein when the phase change material freezes the external radiator is heated to heat the interior of the enclosure.

\* \* \* \* \*